United States Patent
Wedderburn

(10) Patent No.: US 8,474,143 B2
(45) Date of Patent: Jul. 2, 2013

(54) DISPENSING UTENSIL

(76) Inventor: James Wedderburn, Kitchener (CA)

( * ) Notice: Subject to any disclaimer, the term of this patent is extended or adjusted under 35 U.S.C. 154(b) by 40 days.

(21) Appl. No.: 10/327,693

(22) Filed: Dec. 24, 2002

(65) Prior Publication Data

US 2004/0200075 A1  Oct. 14, 2004

(51) Int. Cl.
*B26B 11/00* (2006.01)
*A47J 43/28* (2006.01)

(52) U.S. Cl.
USPC .................. 30/129; 30/128; 30/323

(58) Field of Classification Search
USPC .............. 30/129, 128, 222, 323, 148, 147, 30/227; D7/683, 686; 294/99.2, 99.1, 118, 294/119
See application file for complete search history.

(56) References Cited

U.S. PATENT DOCUMENTS

| | | | | |
|---|---|---|---|---|
| 510,286 A | * | 12/1893 | Osterman | 30/128 |
| 629,082 A | * | 7/1899 | Law | 294/33 |
| 968,968 A | * | 8/1910 | Oblosser | 294/55.5 |
| 1,065,433 A | * | 6/1913 | Dow et al. | 30/129 |
| 1,070,303 A | * | 8/1913 | Stuelke | 30/129 |
| 1,083,296 A | * | 1/1914 | Pontious | 30/129 |
| 1,172,333 A | * | 2/1916 | Williams | 30/129 |
| 1,207,470 A | * | 12/1916 | Banks | 30/129 |
| 1,443,508 A | * | 1/1923 | Small | 30/129 |
| 1,678,368 A | * | 7/1928 | Thomas | 30/129 |
| 1,816,904 A | * | 8/1931 | Heimroth | 294/61 |
| 2,010,074 A | * | 8/1935 | Fuerst | 30/150 |
| D149,920 S | * | 6/1948 | Warner | D7/686 |
| 3,138,211 A | * | 6/1964 | Blom | 172/371 |
| 3,233,325 A | * | 2/1966 | Perry | 30/129 |
| D271,305 S | * | 11/1983 | Kostiner | D16/250 |
| 4,596,130 A | * | 6/1986 | Yoshii et al. | 72/243.6 |
| 4,955,971 A | * | 9/1990 | Goulter | 294/7 |
| D351,534 S | * | 10/1994 | Weber | D7/686 |
| 5,884,953 A | * | 3/1999 | Leighton et al. | 294/99.2 |
| D423,304 S | * | 4/2000 | Kontou et al. | D7/683 |
| 6,584,692 B1 | * | 7/2003 | Stills et al. | 30/129 |
| D515,369 S | * | 2/2006 | Bertulis | D7/686 |

* cited by examiner

*Primary Examiner* — Ghassem Alie
(74) *Attorney, Agent, or Firm* — Norton Rose Canada LLP; Christopher N. Hunter

(57) ABSTRACT

A dispensing utensil includes a body extending between a front end and a back end, and having a handle and a substance-holding end portion having a width and a length. A substance pushing member is for removing substance from the substance-holding end portion of the body. An arm has a front end and a back end, and is connected adjacent the front end to the substance pushing member and is connected adjacent the back end to the handle. The substance pushing member is movable along the substance-holding end portion between a rest position and a dispensing position. The distance between the rest position and the flexed dispensing position includes a substantial portion of the substance-holding end portion.

16 Claims, 18 Drawing Sheets

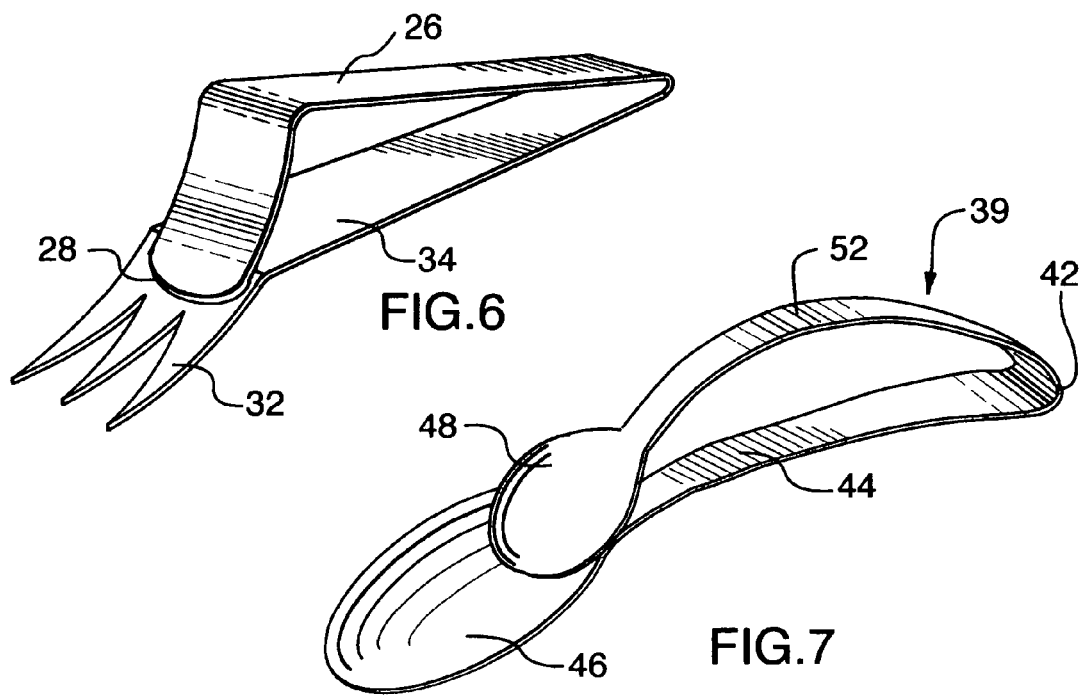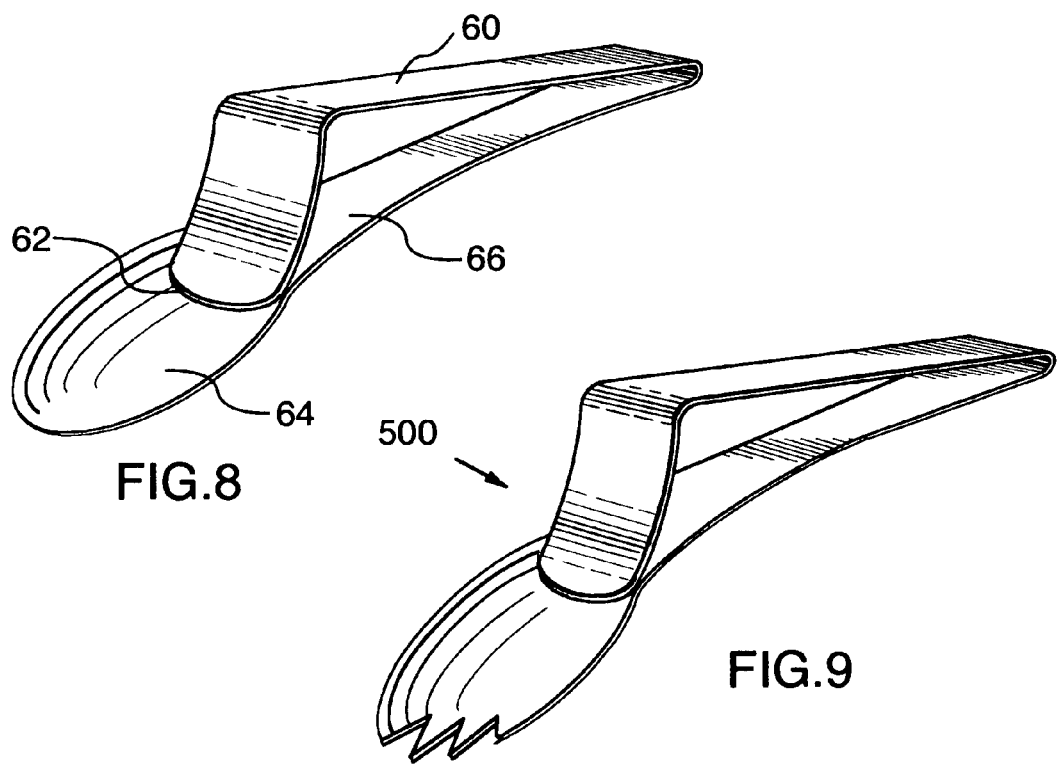

DISPENSING UTENSIL

FIELD OF THE INVENTION

The present invention relates to dispensing utensils that can be manually manipulated to dislodge a substance therefrom, and more particularly to a food-serving utensil such as a fork, spoon or a knife that can be manually manipulated to dislodge a piece of food therefrom.

BACKGROUND OF THE INVENTION

Dispensing utensils are used extensively in the serving of buffet meals where guests pass along a food table laden with food and take their requirements from serving plates as they pass by. There is always a problem with some foods and some guests in removing food selected by a guest for his plate from the fork or spoon. The food in these particular situations just does not want to leave the utensil. It is solved in many cases by fingering the food off the food utensil. In other cases a vigorous shaking, of the dispensing utensil will suffice. In still other cases observant guests will not impale food on the fork or place food on the end of the spoon very securely. This can result in dropped food. In any event there is a problem and this invention overcomes the problem.

There are also other situations where a utensil is used to dispense a substance, such as scooping pet food into a dish. The consistency of many types of pet foods is such that it sticks the dispensing utensil, which makes it very difficult to dispense.

It is an object of this invention to provide a dispensing utensil that can be simply and manually manipulated to dislodge a substance off the dispensing utensil.

It is an object of this invention to provide a food-serving utensil for food and the like that can be simply and manually manipulated to dislodge food off the food-serving utensil.

It is a further object of this invention to provide such a dispensing utensil that is inexpensive to manufacture.

SUMMARY OF THE INVENTION

In accordance with one aspect of the present invention there is disclosed a novel dispensing utensil comprising a body extending between a front end and a back end, and having a handle and a substance-holding end portion having a width and a length; a substance pushing member for removing substance from the substance-holding end portion of the body; and, a resiliently deformable arm having a front end and a back end, and connected adjacent the front end to the substance pushing member and connected adjacent the back end to the handle. The substance pushing member is movable along the substance-holding end portion between a rest position and a flexed dispensing position, and wherein the distance between the rest position and the flexed dispensing position comprises a substantial portion of the substance-holding end portion.

In accordance with another aspect of the present invention there is disclosed a novel dispensing utensil comprising a body extending between a front end and a back end, and having a handle and a substance-holding end portion having a width and a length; a substance pushing member for removing substance from the substance-holding end portion of the body; and, an arm having a front end and a back end, and connected adjacent the front end to the substance pushing member and connected adjacent the back end to the handle. The substance-holding end portion is sloped downwardly to the front of the body, and the substance pushing member is movable along the substance-holding end portion between a rest position and a dispensing position, and wherein the distance between the rest position and the dispensing position comprises a substantial portion of the substance-holding end portion.

In accordance with yet another aspect of the present invention there is disclosed a novel dispensing utensil comprising a body extending between a front end and a back end, and having a handle and a substance-holding end portion having a width and a length; a substance pushing member for removing substance from the substance-holding end portion of the body; and, an arm having a front end and a back end, and connected adjacent the front end to the substance pushing member and connected adjacent the back end to the handle. The arm has a self-supporting upwardly bowed portion, and the upwardly bowed portion presents a rear-facing thumb-engaging portion, and wherein when the upwardly bowed portion is pushed forwardly at the rear-facing thumb-engaging portion, the substance pushing member is moved along the substance-holding end portion from the rest position to the dispensing position.

In accordance with yet another aspect of the present invention there is disclosed a novel dispensing utensil comprising a body extending between a front end and a back end, and having a handle and a substance-holding end portion having a width and a length, a substance pushing member for removing substance from the substance-holding end portion of the body; and an arm having a front end and a back end, and connected adjacent the front end to the substance pushing member and pivotally connected adjacent the back end to the handle. The substance pushing member is movable along the substance-holding end portion between a rest position and a dispensing position, and wherein the distance between the rest position and the dispensing position comprises a substantial portion of the substance-holding end portion.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the dispensing utensil according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 6 is a perspective view of second preferred embodiment of the dispensing utensil according to the present invention;

FIG. 7 is a perspective view of a third preferred embodiment of the dispensing utensil according to the present invention;

FIG. 8 is a perspective view of a fourth preferred embodiment of the dispensing utensil according to the present invention;

FIG. 9 is a perspective view of a fifth preferred embodiment of the dispensing utensil according to the present invention;

DETAILED DESCRIPTION OF A PREFERRED EMBODIMENT

Figure 10:
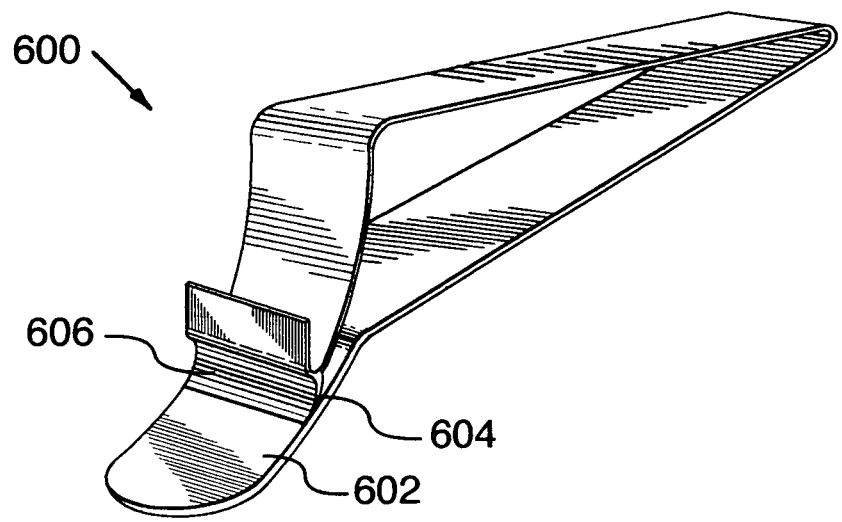
FIG. 10 is a perspective view of a sixth preferred embodiment of the dispensing utensil according to the present invention.
Figure 11:
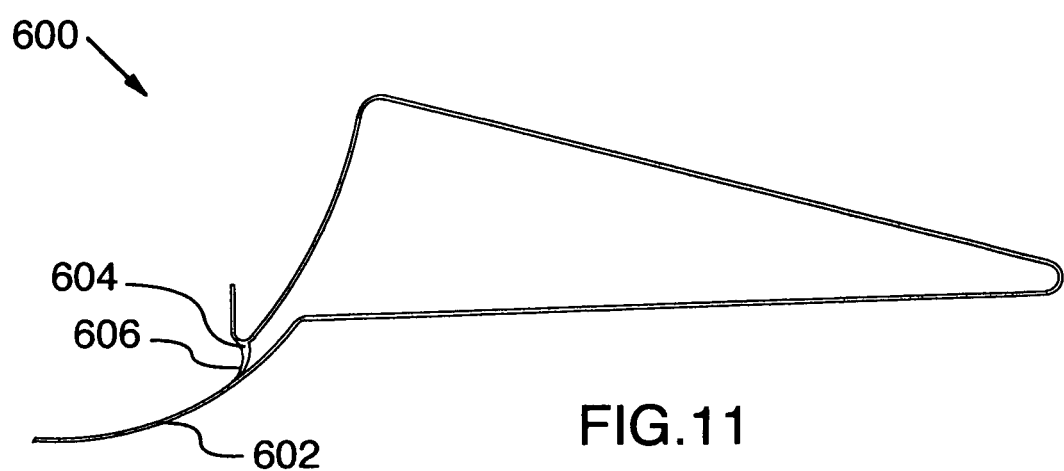
FIG. 11 is a side elevational view of the dispensing utensil of FIG. 10.
Figure 12:
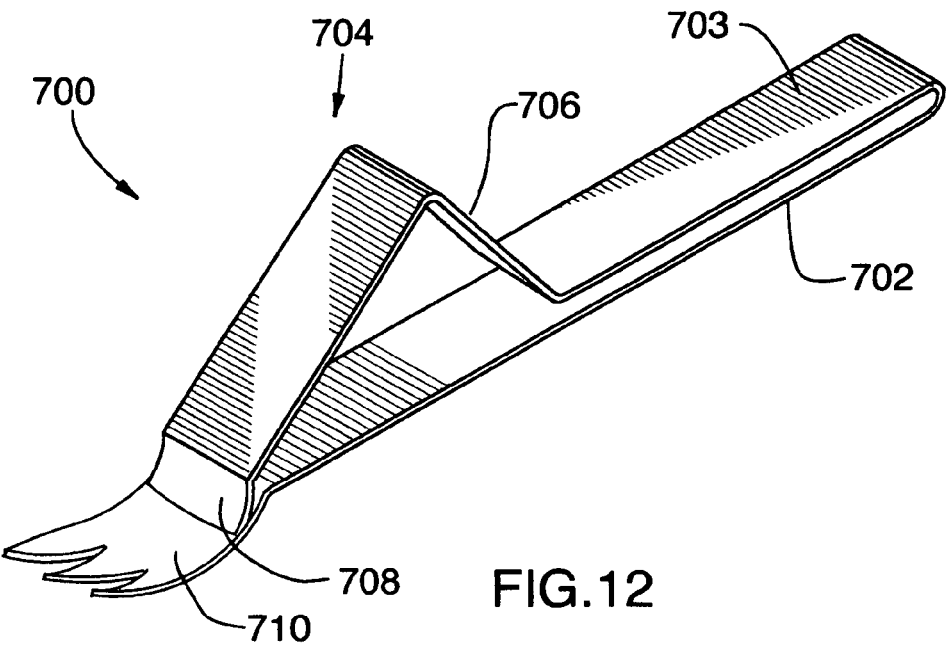
FIG. 12 is a perspective view of a seventh preferred embodiment of the dispensing utensil according to the present invention.
Figure 13:
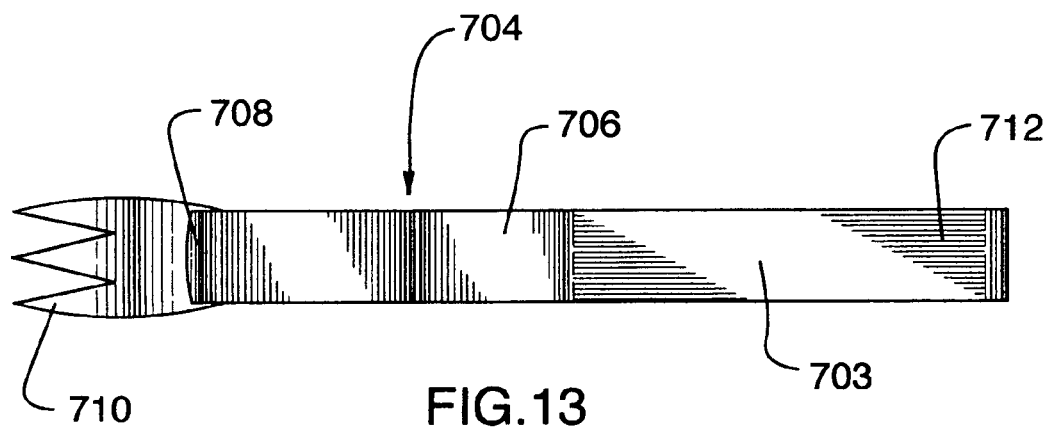
FIG. 13 is a top plan view of the dispensing utensil of FIG. 12.
Figure 14:
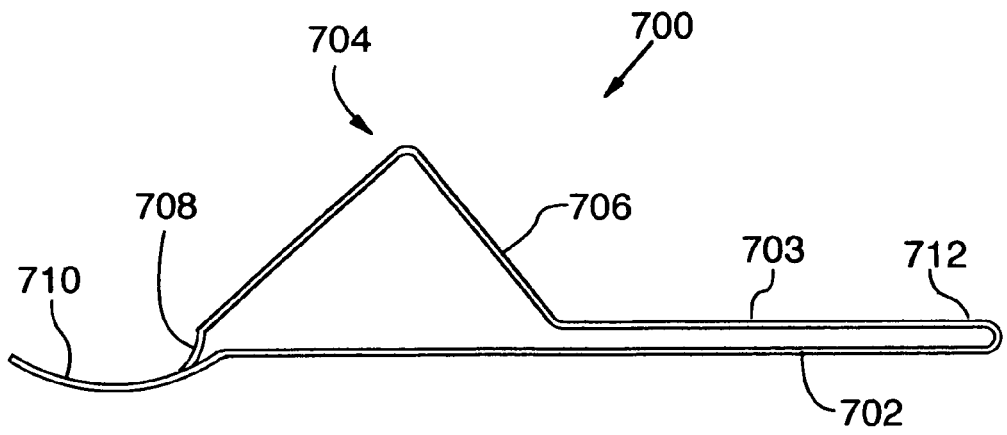
FIG. 14 is a side elevational view of the dispensing utensil of FIG. 12.
Figure 15:
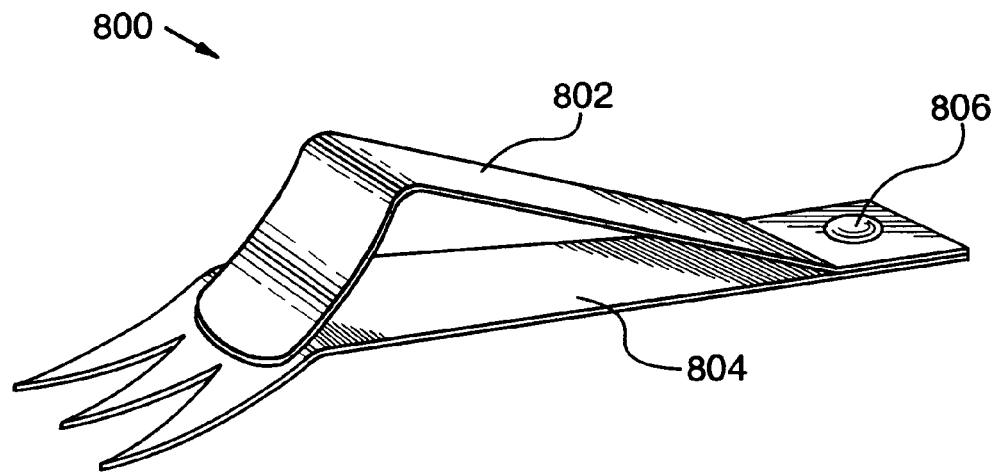
FIG. 15 is a perspective view of a eighth preferred embodiment of the dispensing utensil according to the present invention.
Figure 16:
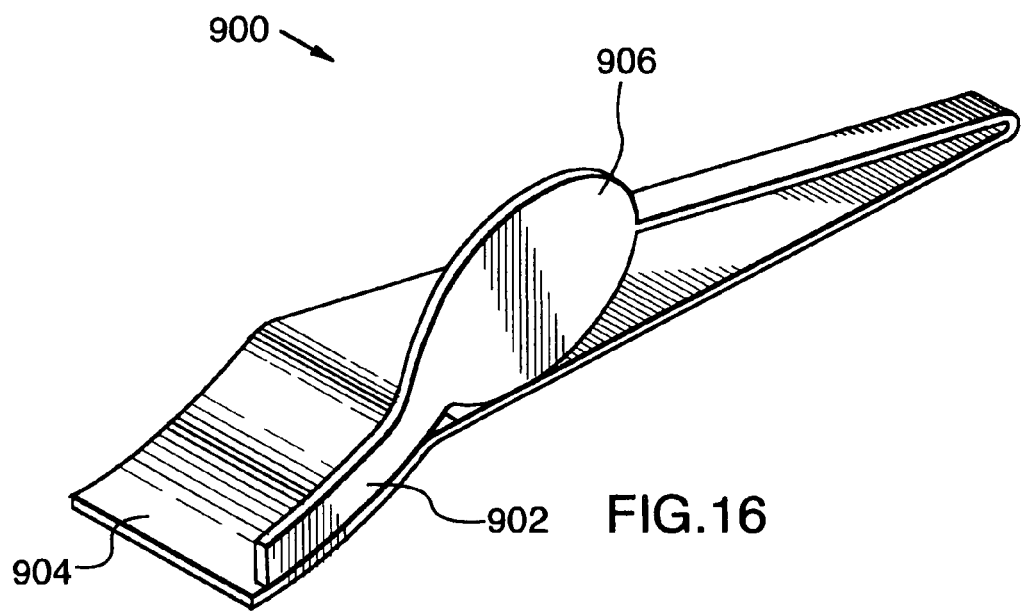
FIG. 16 is a perspective view of a ninth preferred embodiment of the dispensing utensil according to the present invention.
Figure 17:
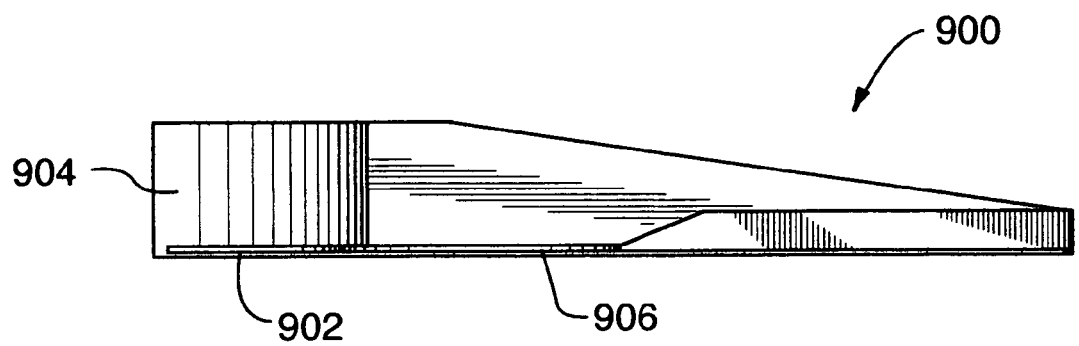
FIG. 17 is a top plan view of the dispensing utensil of FIG. 16.
Figure 18:
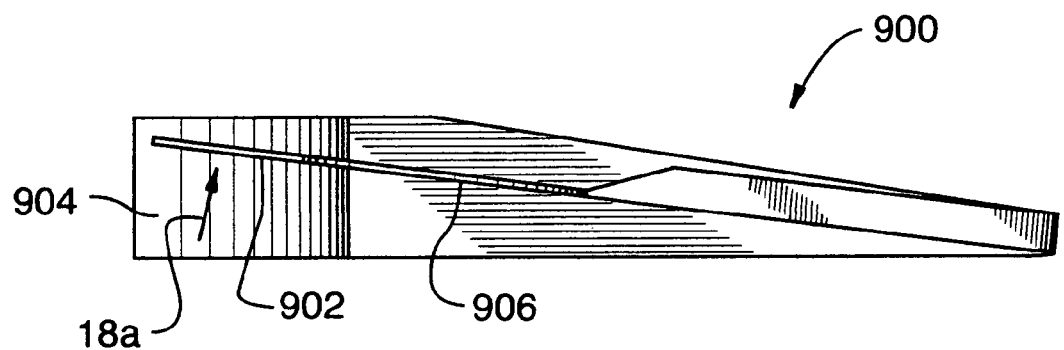
FIG. 18 is a top plan view similar to FIG. 17 but with a portion of the dispensing utensil moving with respect to another portion of the dispensing utensil.
Figure 19:
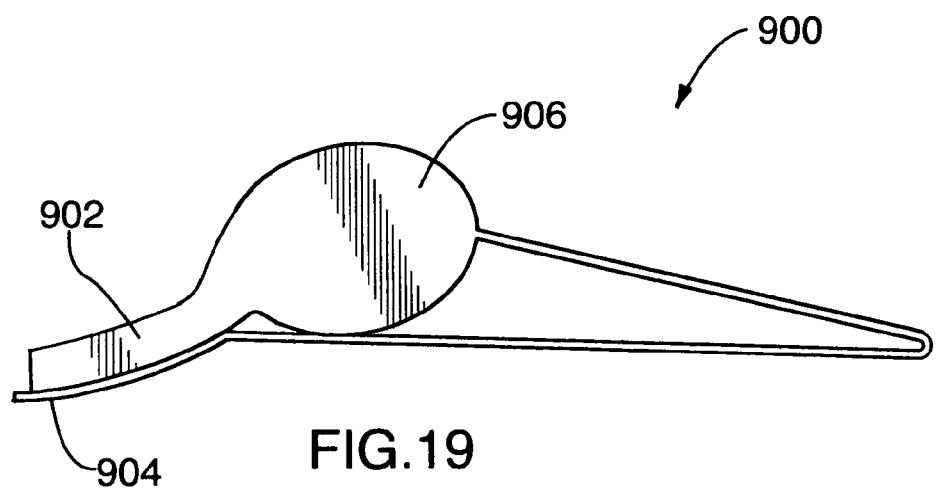
FIG. 19 is a side elevational view of the dispensing utensil of FIG. 16.
Figure 20:
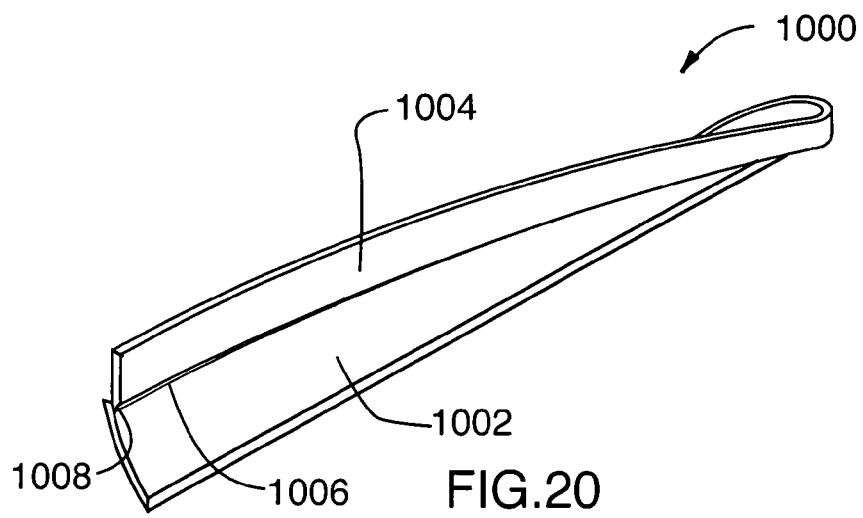
FIG. 20 is a perspective view of a tenth preferred embodiment of the dispensing utensil according to the present invention.
Figure 21:
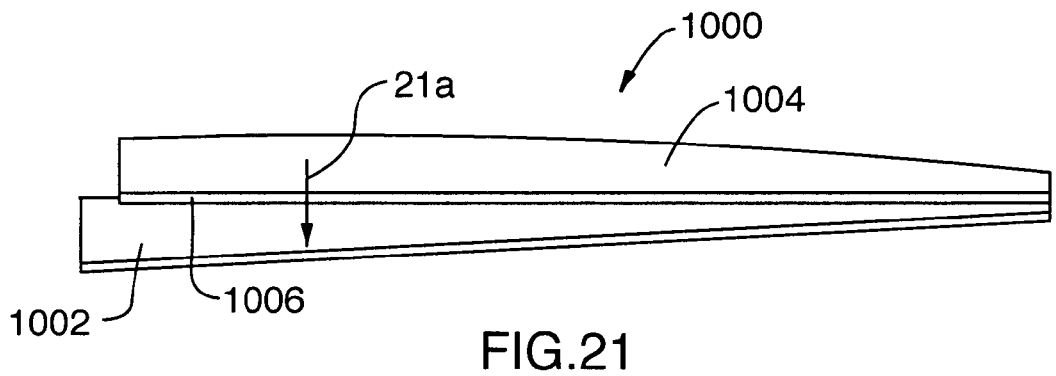
FIG. 21 is a side elevational view of the dispensing utensil of FIG. 20.
Figure 22:
FIG. 22 is a top plan view of the dispensing utensil of FIG. 20.
Figure 23:
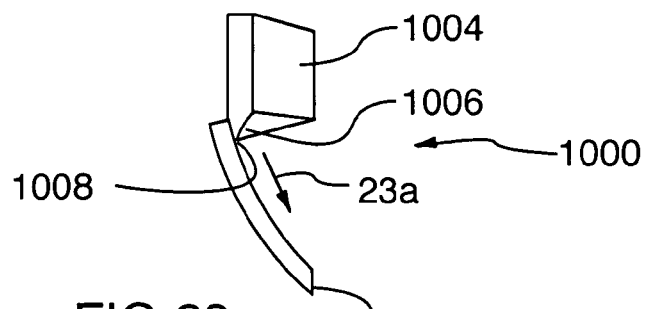
FIG. 23 is an end elevational view of the dispensing utensil of FIG. 20.
Figure 24:
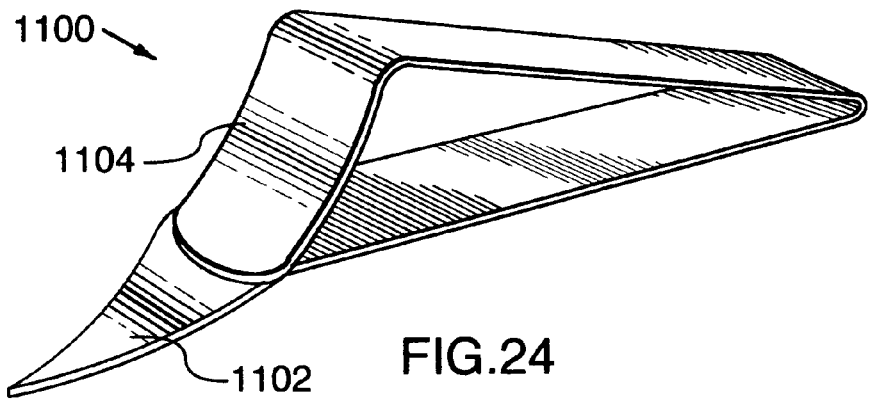
FIG. 24 is a perspective view of an eleventh preferred embodiment of the dispensing utensil according to the present invention.
Figure 25:
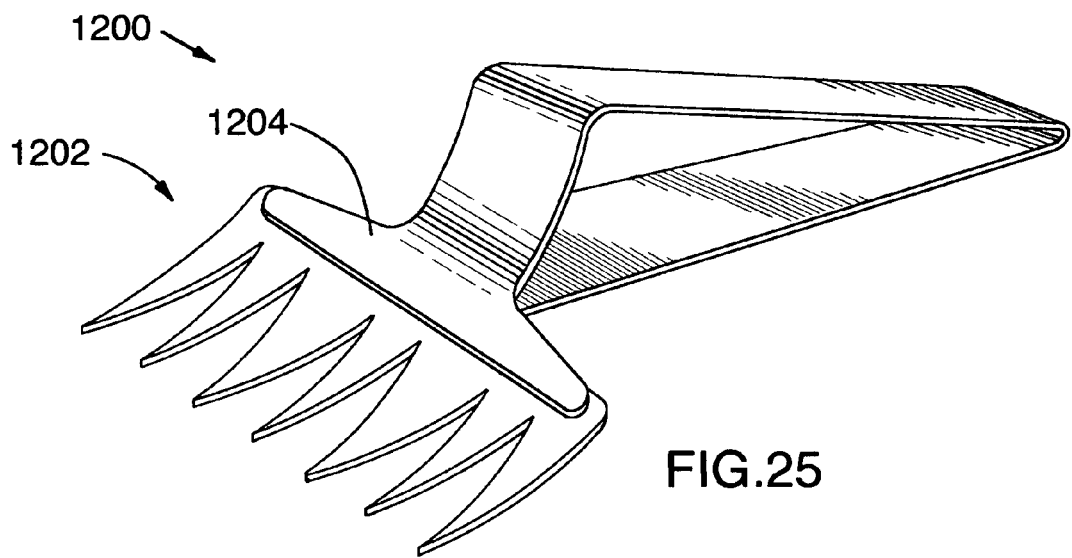
FIG. 25 is a perspective view of a twelfth preferred embodiment of the dispensing utensil according to the present invention.
Figure 26:
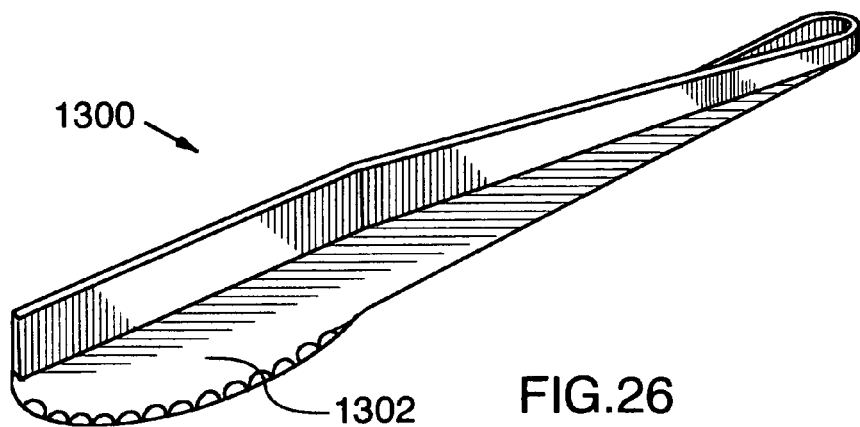
FIG. 26 is a perspective view of a thirteenth preferred embodiment of the dispensing utensil according to the present invention.
Figure 27:
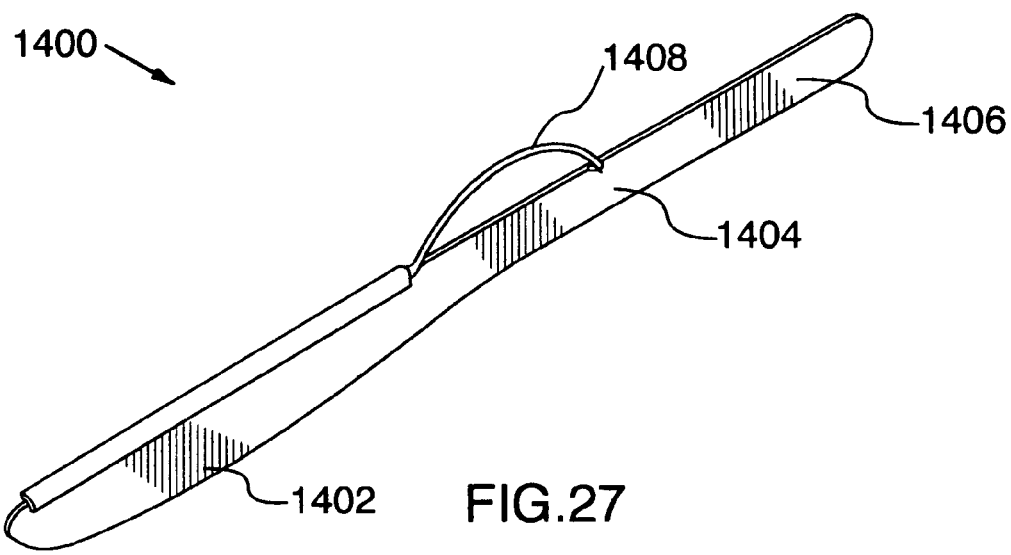
FIG. 27 is a perspective view of a fourteenth preferred embodiment of the dispensing utensil according to the present invention.
Figure 28:
FIG. 28 is a top plan view of the dispensing utensil of FIG. 27.
Figure 29:
FIG. 29 is a side elevational view of the dispensing utensil of FIG. 27.
Figure 30:
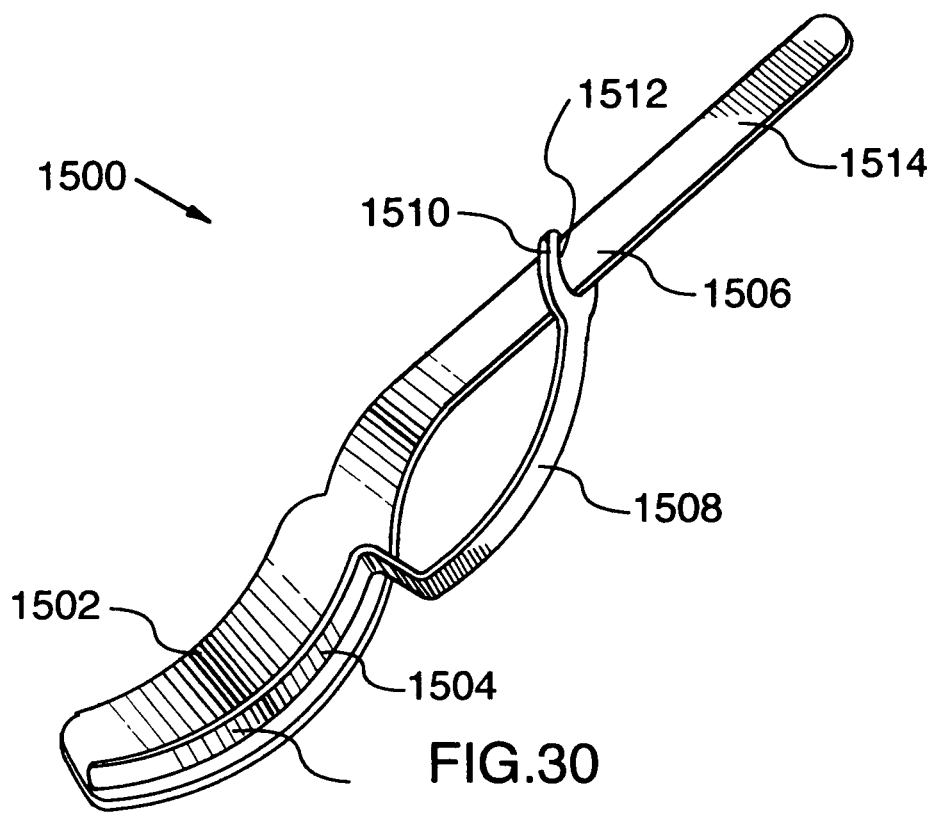
FIG. 30 is a perspective view of a fifteenth preferred embodiment of the dispensing utensil according to the present invention.
Figure 31:
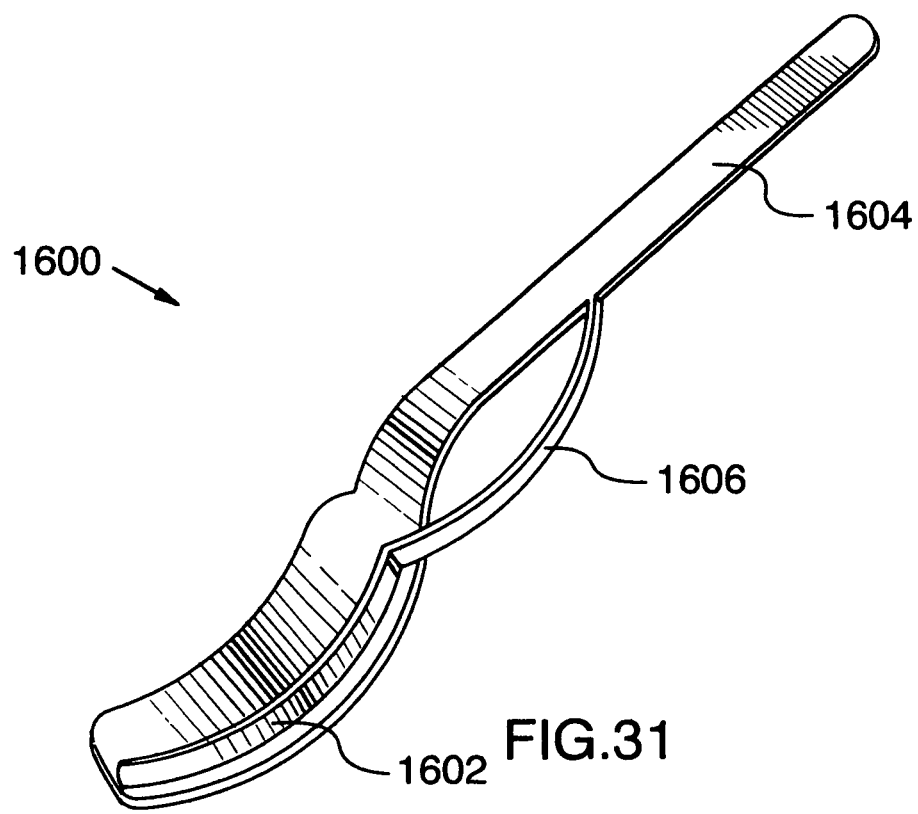
FIG. 31 is a perspective view of a sixteenth preferred embodiment of the dispensing utensil according to the present invention.
Figure 32:
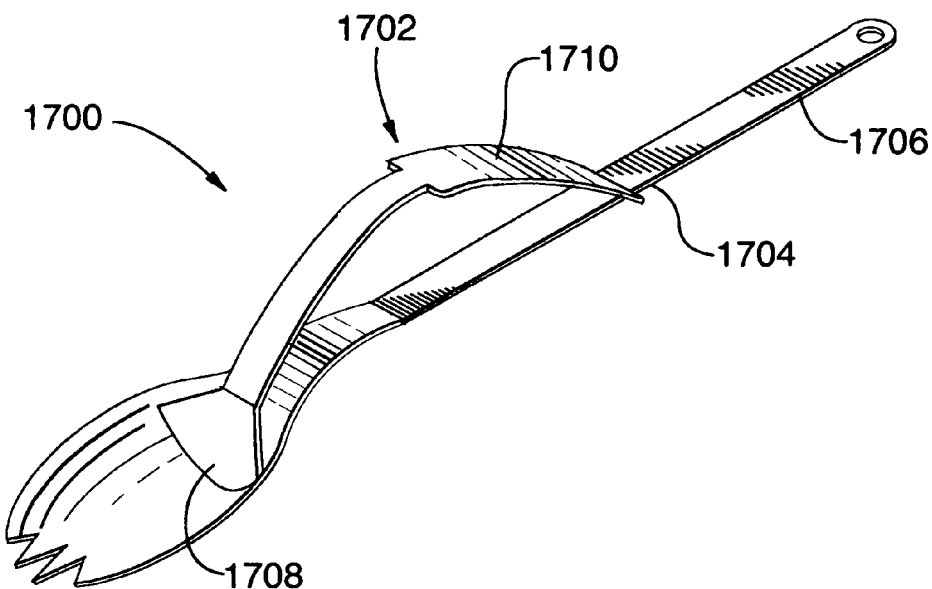
FIG. 32 is a perspective view of a seventeenth preferred embodiment of the dispensing utensil according to the present invention.
Figure 33:
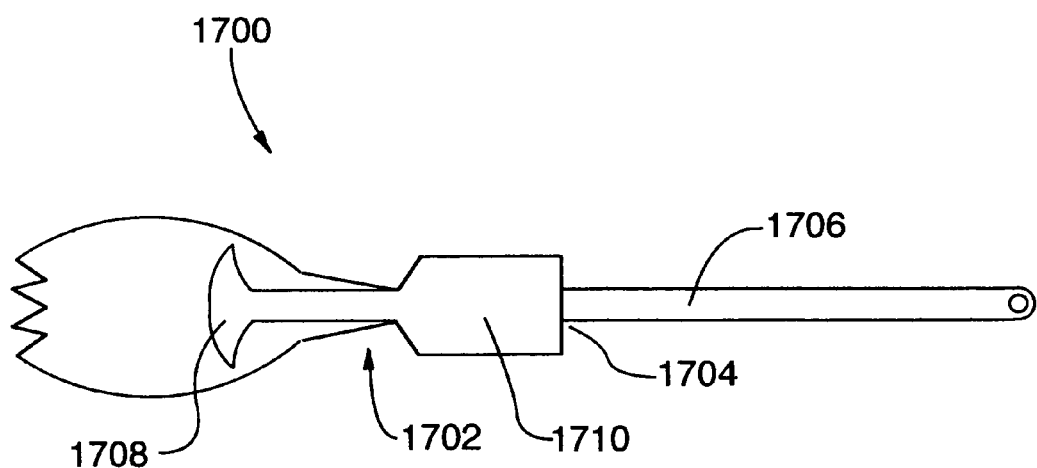
FIG. 33 is a top plan view of the dispensing utensil of FIG. 32.
Figure 34:
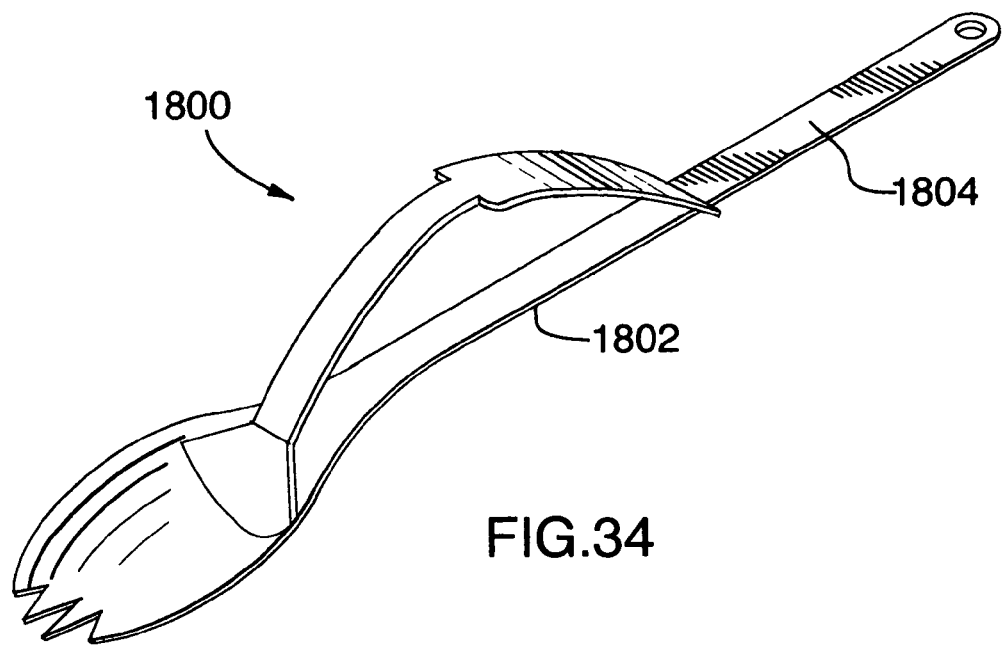
FIG. 34 is a perspective view of a eighteenth preferred embodiment of the dispensing utensil according to the present invention.
Figure 35:
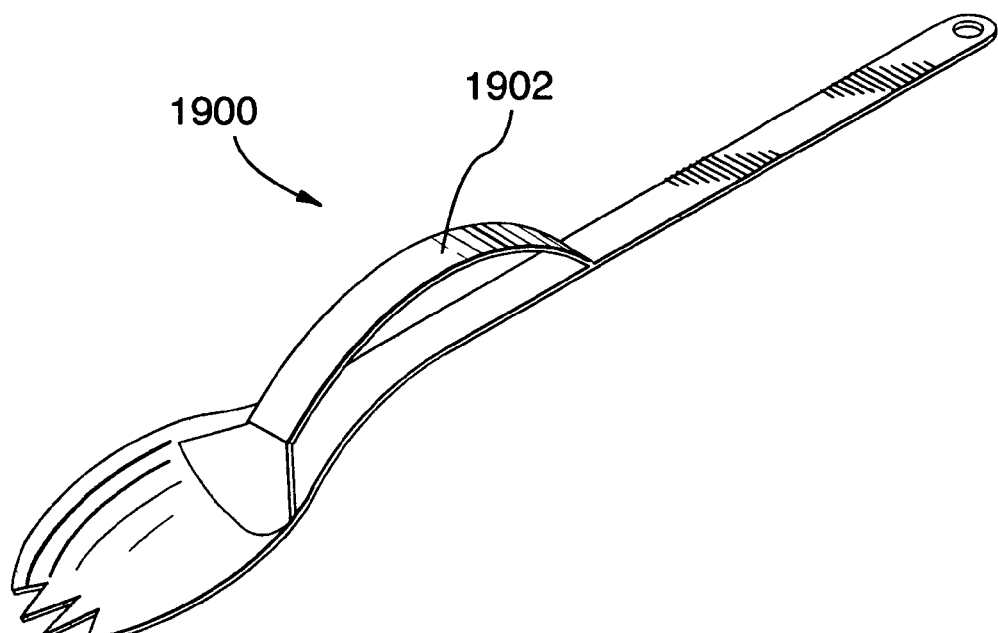
FIG. 35 is a perspective view of a nineteenth preferred embodiment of the dispensing utensil according to the present invention.
Figure 36:
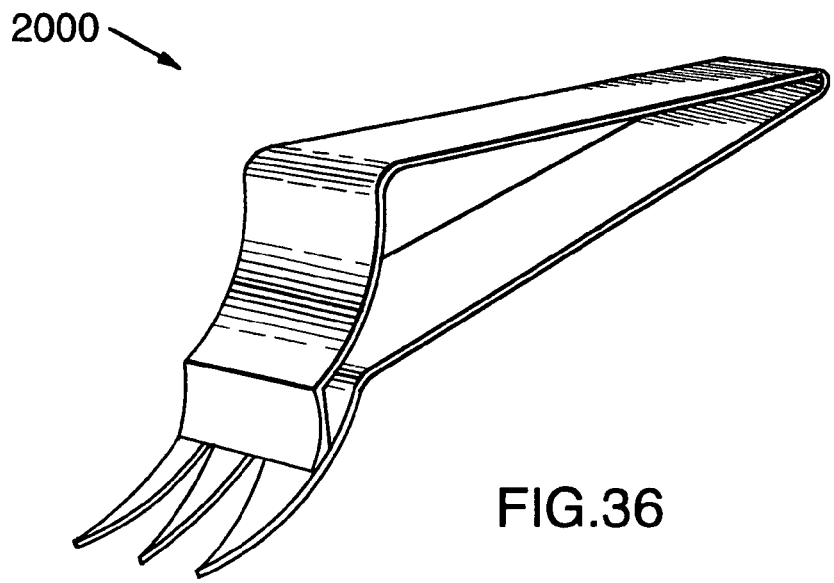
FIG. 36 is a perspective view of a twentieth preferred embodiment of the dispensing utensil according to the present invention.
Figure 37:
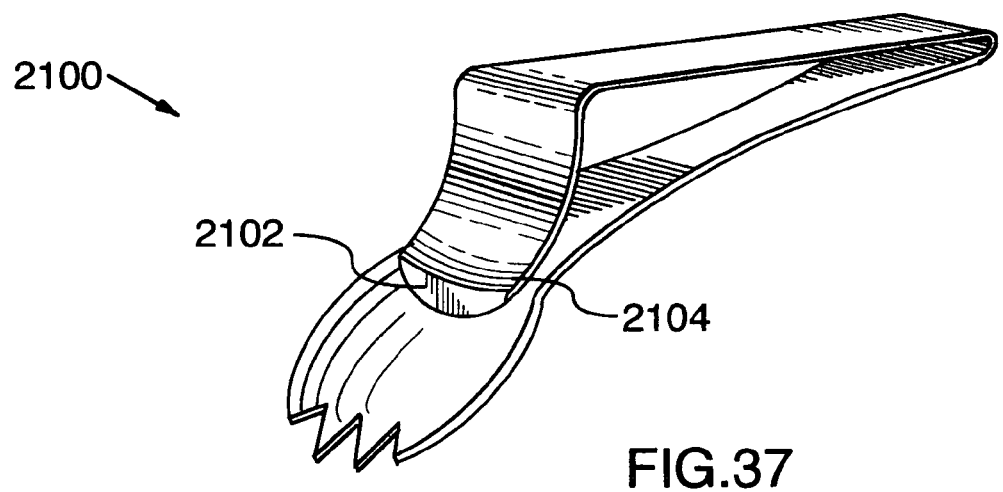
FIG. 37 is a perspective view of a twenty-first preferred embodiment of the dispensing utensil according to the present invention.
Figure 38:
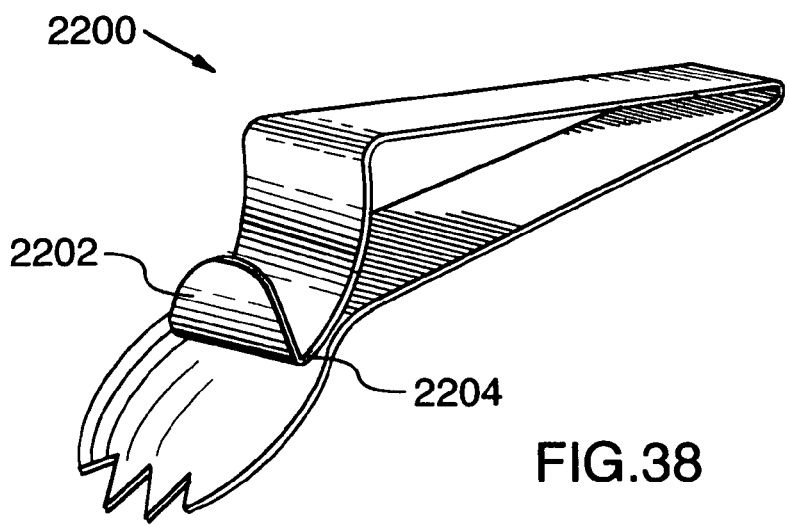
FIG. 38 is a perspective view of a twenty-second preferred embodiment of the dispensing utensil according to the present invention.
Figure 39:
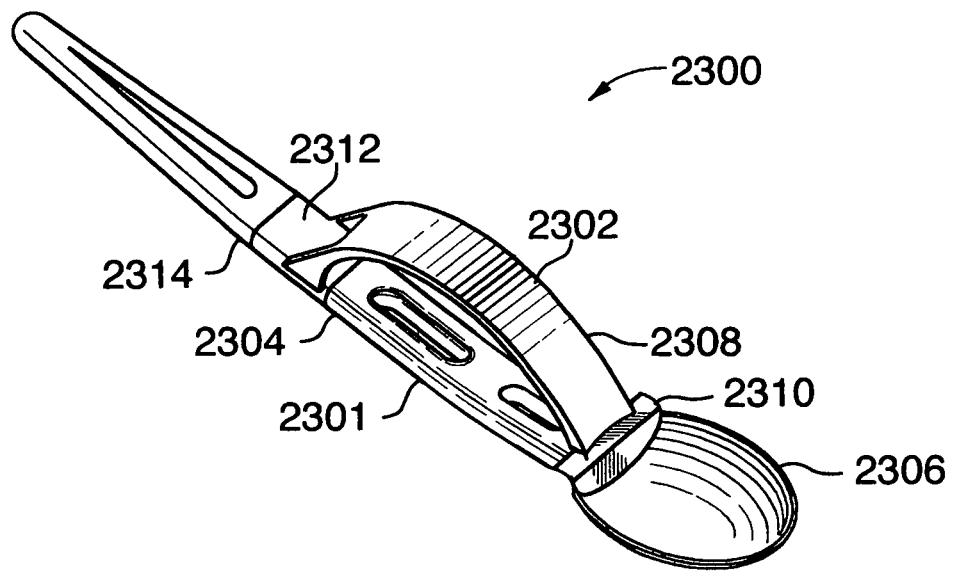
FIG. 39 is a perspective view of a twenty-third preferred embodiment of the dispensing utensil according to the present invention.
Figure 40:
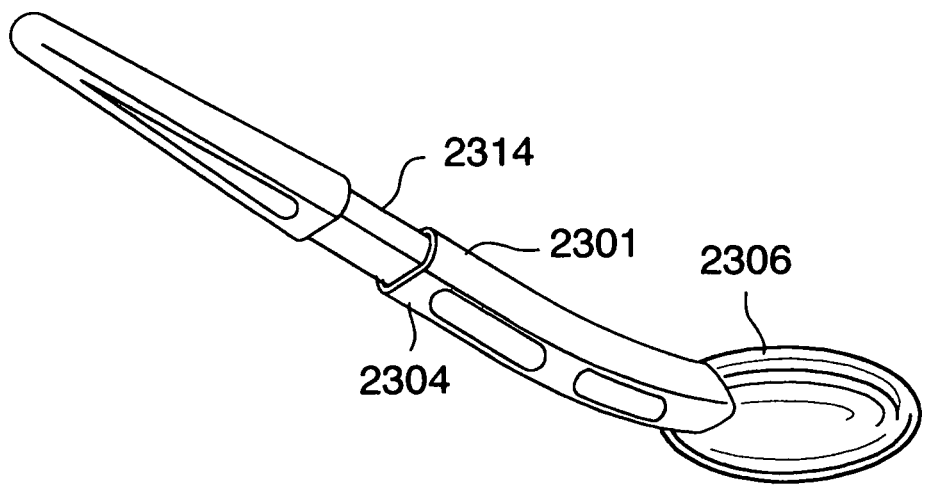
FIG. 40 is a perspective view of a first portion of the twenty-third preferred embodiment of the dispensing utensil shown in FIG. 39.
Figure 41:
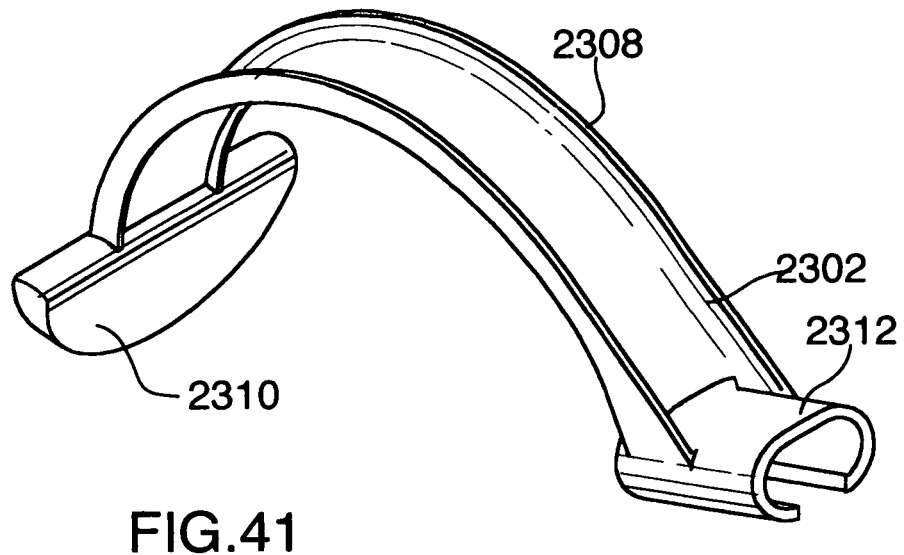
FIG. 41 is a perspective view of a second portion of the twenty-third preferred embodiment of the dispensing utensil shown in FIG. 39.
Figure 42:
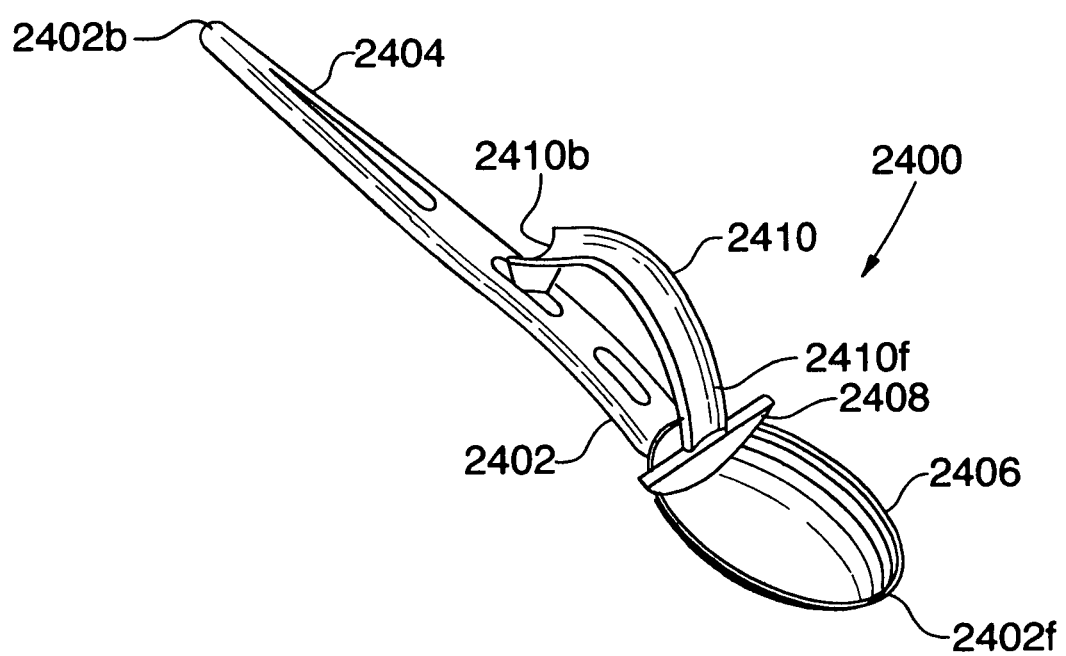
FIG. 42 is a front perspective view of a twenty-fourth preferred embodiment of the dispensing utensil according to the present invention, with the substance pushing member in its rest position.
Figure 43:
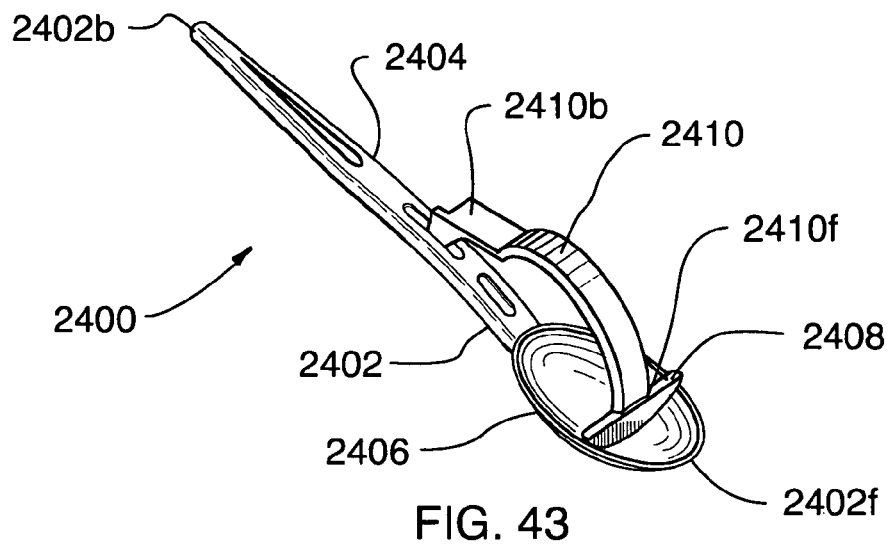
FIG. 43 is a front perspective view similar to FIG. 42, but with the substance pushing member in its flexed dispensing position.
Figure 44:
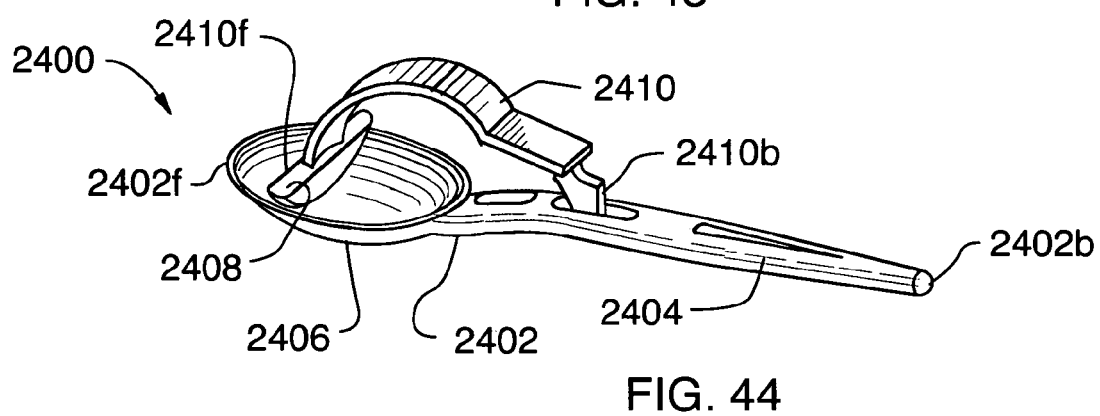
FIG. 44 is a rear perspective view of the dispensing utensil as shown in FIG. 43.
Figure 45:
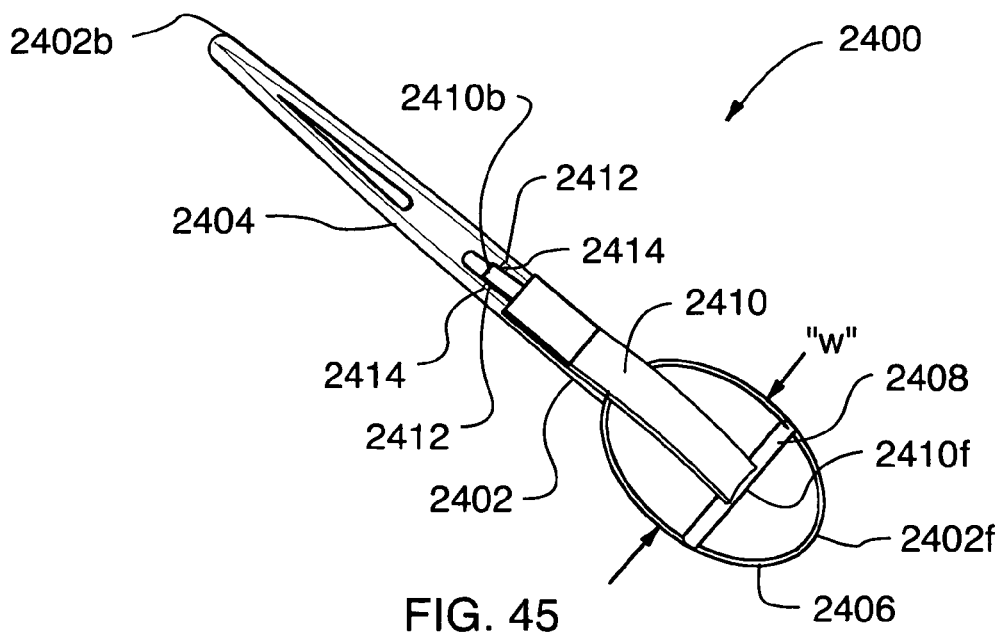
FIG. 45 is a top plan view of the dispensing utensil as shown in FIG. 43.
Figure 46:
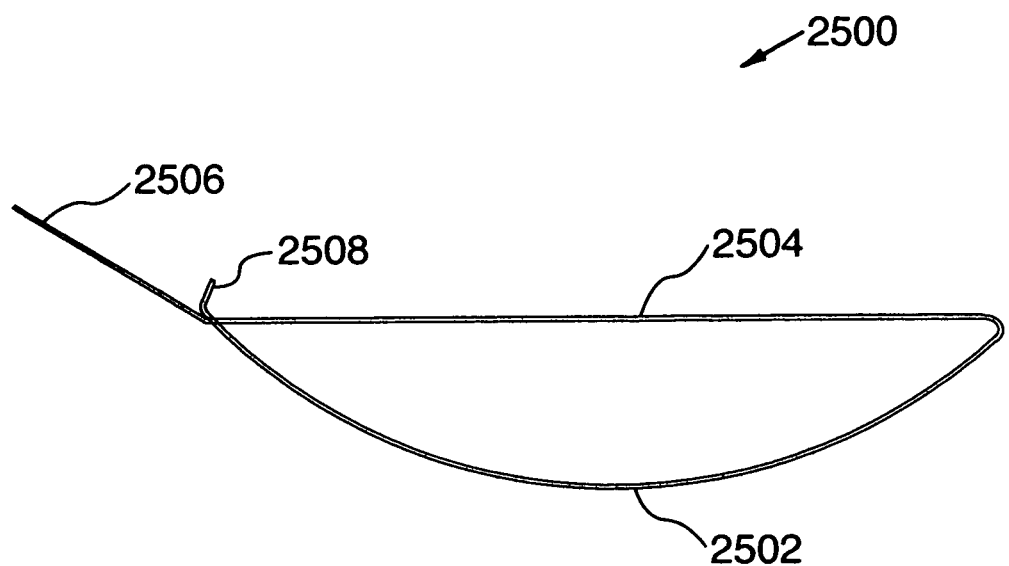
FIG. 46 is a side elevational view of a twenty-fifth preferred embodiment of the dispensing utensil according to the present invention, with the substance pushing member in its rest position; and, FIG. 47 is a side elevational view similar to FIG. 47, but with the substance pushing member in its dispensing position.
Figure 47:
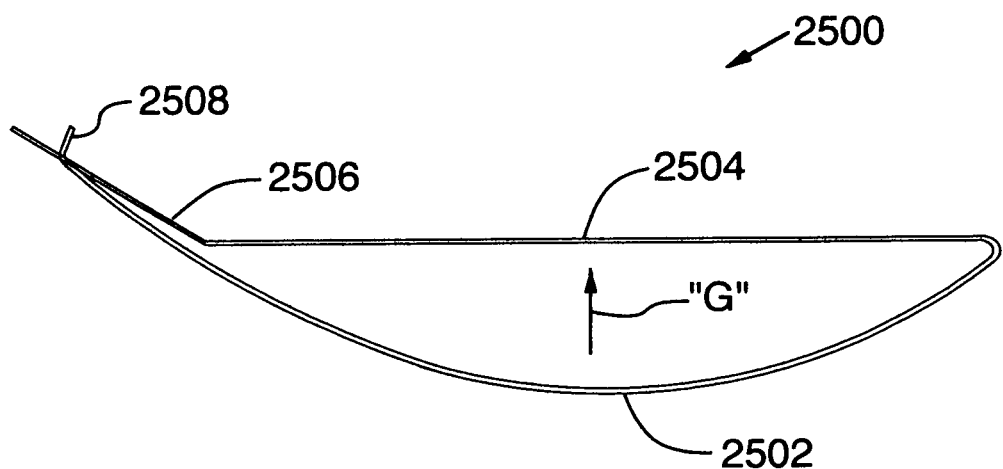

Referring to FIGS. 1 through 47 of the drawings, it will be noted that FIGS. 1 through 5 illustrate a first preferred embodiment of the dispensing utensil of the present invention, FIG. 6 illustrates a second preferred embodiment of the dispensing utensil of the present invention, FIG. 7 illustrates a third preferred embodiment of the dispensing utensil of the present invention, FIG. 8 illustrates a fourth preferred embodiment of the dispensing utensil of the present invention, FIG. 9 illustrates a fifth preferred embodiment of the dispensing utensil of the present invention, FIGS. 10 and 11 illustrate a sixth preferred embodiment of the dispensing utensil of the present invention, FIGS. 12 through 14 illustrate a seventh preferred embodiment of the dispensing utensil of the present invention, FIG. 15 illustrates a eighth preferred embodiment of the dispensing utensil of the present invention, FIGS. 16 through 19 illustrate a ninth preferred embodiment of the dispensing utensil of the present invention, FIGS. 20 through 23 illustrate a tenth preferred embodiment of the dispensing utensil of the present invention, FIG. 24 illustrates a eleventh preferred embodiment of the dispensing utensil of the present invention, FIG. 25 illustrates a twelfth preferred embodiment of the dispensing utensil of the present invention, FIG. 26 illustrates a thirteenth preferred embodiment of the dispensing utensil of the present invention, FIGS. 27 through 29 illustrates a fourteenth preferred embodiment of the dispensing utensil of the present invention, FIG. 30 illustrates a fifteenth preferred embodiment of the dispensing utensil of the present invention, FIG. 31 illustrates a sixteenth preferred embodiment of the dispensing utensil of the present invention, FIGS. 32 and 33 illustrate a seventeenth preferred embodiment of the dispensing utensil of the present invention, FIG. 34 illustrates a eighteenth preferred embodiment of the dispensing utensil of the present invention, FIG. 35 illustrates a nineteenth preferred embodiment of the dispensing utensil of the present invention, FIG. 36 illustrates a twentieth preferred embodiment of the dispensing utensil of the present invention, FIG. 37 illustrates a twenty-first preferred embodiment of the dispensing utensil of the present invention, FIG. 38 illustrates a twenty-second preferred embodiment of the dispensing utensil of the present invention, FIGS. 39 through 41 illustrate a twenty-third preferred embodiment of the dispensing utensil of the present invention, FIGS. 42 through 45 illustrate a twenty-fourth preferred embodiment of the dispensing utensil of the present invention, and FIGS. 46 and 47 illustrate a twenty-fifth preferred embodiment of the dispensing utensil of the present invention.

Reference will now be made to FIGS. 1 through 5, which show a first preferred embodiment of the dispensing utensil of the present invention, as indicated by general reference numeral 8. The dispensing utensil 8 is in the form of a fork and comprises a body 10 extending between a front end 10*f* and a back end 10*b*. A substantially rigid handle 12 has a substance-holding pronged end portion 14 for holding food. The substance-holding end portion has a width "W" and a length "L", and is sloped downwardly to the front 10*f* of the body 10. The substance-holding end portion 14, which is an example of a food engaging feature of the dispensing utensil, is therefore angled away along its entire length from a longitudinal axis defined by the length of the handle 12. A substance pushing member in the form of a scraper 16 is formed at the curved outer part 18 of the arm, generally referred to by the numeral 20. The substance pushing member is for removing substance from the substance-holding end portion 16 of the body 10. The arm 20 is resiliently deformable and has a front 20*f* end and a back end 20*b*. As can be seen in the Figures, the resiliently deformable arm 20 is connected adjacent its front end 20*f*, and preferably at the front end 20*f*, to the substance pushing member 16. Further, the arm 20 is connected adjacent its back end 20*f*, and preferably at its back end 20*f*, to the handle 12. As illustrated, the arm 20 has a straight section 22 that joins with the handle 12 of the body 10.

Figure 1:
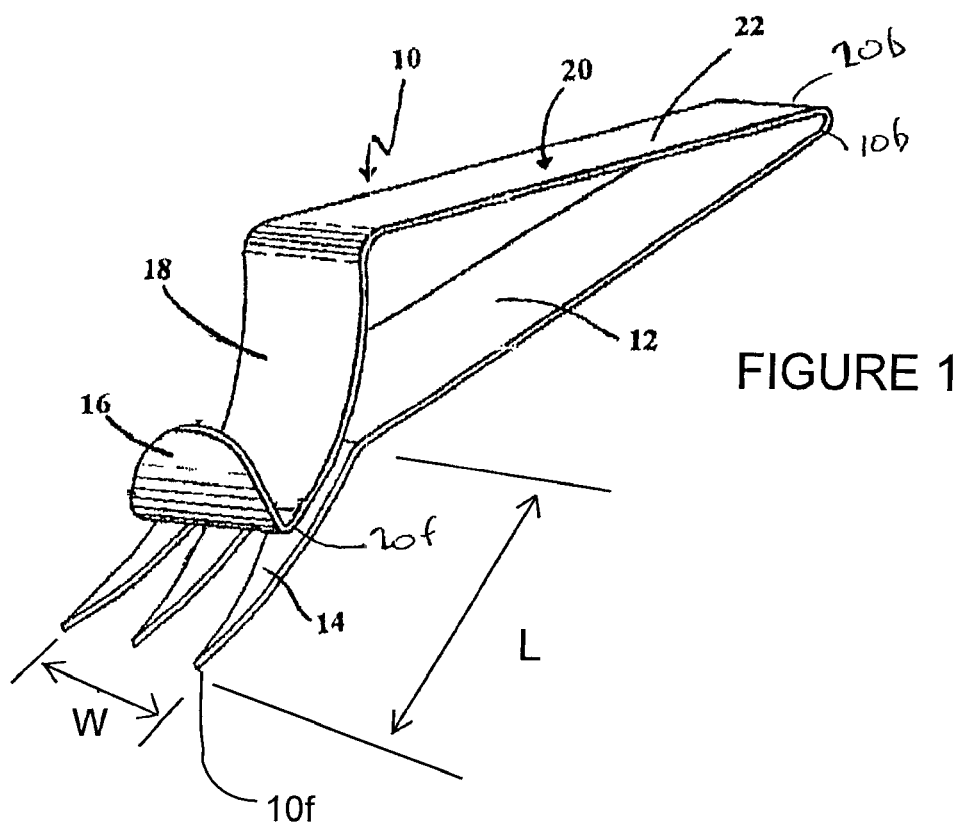
FIG. 1 is a perspective view of a first preferred embodiment of the dispensing utensil according to the present invention.
Figure 2:
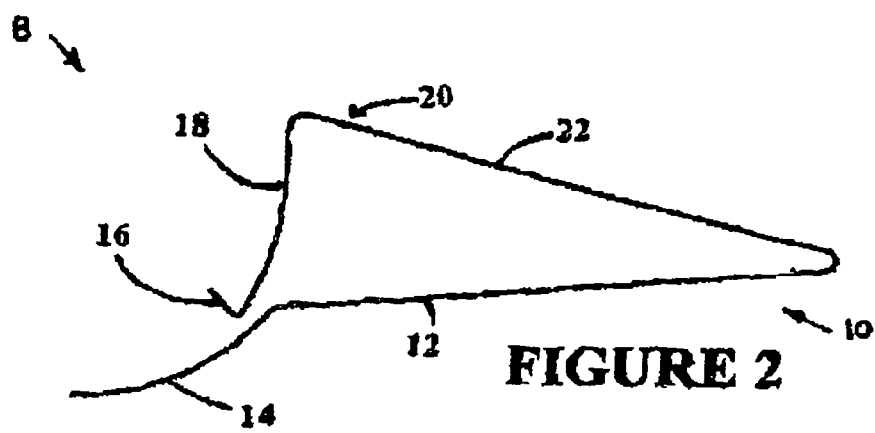
FIGS. 2, 3, 4 and 5 are line illustrations of the operation of the dispensing utensil of FIG. 1.
Figure 3:
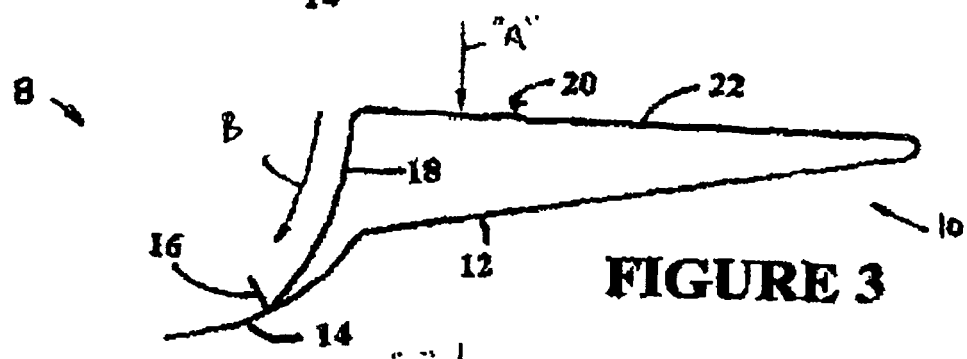
Figure 4:
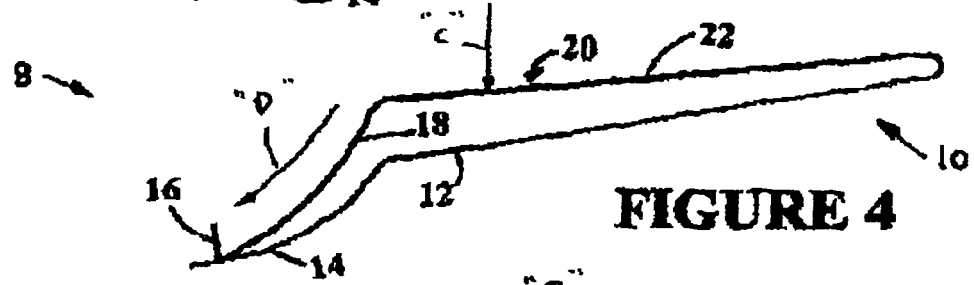
Figure 5:
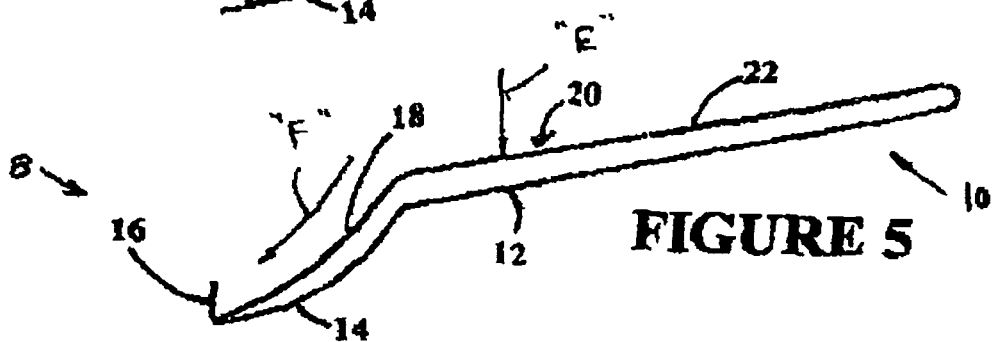

As can be seen in FIGS. 2, 3, 4 and 5, which are line drawings illustrating the flexing and scraping action of the dispensing utensil 8. The substance pushing member 16 is movable along the substance-holding end portion 14 between a rest position, as shown in FIG. 2, and a flexed dispensing position. Various flexed dispensing positions are shown in FIGS. 3 through 5. FIG. 3 shows a flexed dispensing position wherein the substance pushing member 16 has moved just past half way along the substance-holding end portion 14, as indicated by arrow "A", through downward flexion of the resiliently deformable arm 20, as indicated by arrow "B". In this position, in many instances, at least a substantial portion of the substance on the substance-holding end portion 14 would be dispensed. FIG. 4 shows a flexed dispensing position where the substance pushing member 16 has moved almost all of the way along the substance-holding end portion 14, as indicated by arrow "C", through downward flexion of the resiliently deformable arm 20, as indicated by arrow "D".

In this position, virtually of the substance on the substance-holding end portion 14 would be dispensed, except possibly in some cases. FIG. 5 shows the substance pushing member 16 having moved entirely to the front end 20*f* of the substance-holding end portion 14, as indicated by arrow "E", through downward flexion of the resiliently deformable arm 20, as indicated by arrow "F". In this flexed dispensing position, essentially all of the substance on the substance-holding end portion 14 would be dispensed, even if it was solid item, such as perhaps a pickle, impaled by the substance-holding end portion 14.

As can be seen in FIGS. 2 through 5, the distance between the rest position and the various flexed dispensing positions comprises of substantial portion of the substance-holding end portion 14. The substance pushing member 16 is movable along the length "L" of the substance-holding end portion 14.

The dispensing utensil 8 is preferably made of suitable resilient flexible material such as stainless spring steel, but other resilient compositions such as commerically available moldable materials or plastics material, or other resilient metals can also be used. The dispensing utensil 8 is preferably formed from a single unitary piece of metal or plastic. Alternatively, the dispensing utensil 8 may be formed from both plastic and metal. The area of greatest arm flex will be at the bend 24 of the scraper arm 20. It will be noted that the scraper arm 20 is resilient and bowed in a direction away from the handle and, in use, as the bowed and resilient scraper arm is manually pressed towards the handle, the end of the scraper arm bears against and outwardly of the pronged end of the fork and causes the scraper 16 to move outwardly of the pronged end to push off any food that may be impaled on the fork. This action is illustrated in FIGS. 2, 3, 4 and 5.

The embodiment is capable of variation in form without departing from the spirit of the present invention. For example the upturned scraper 16 could be replaced by the simple forward edge of the curved section 18 of the scraper arm 20. Such an embodiment is illustrated in FIG. 6. In FIG. 6, there is a bowed scraper arm 26 with a scraper edge 28 at the free end thereof for slideable engagement with the pronged end portion 32 of the handle 34. The operation of this embodiment is similar to the operation of the embodiment shown in FIGS. 1 to 5. As the bowed handle is flexed to carry it toward the handle 34, the scraper edge 28 is pushed outwardly along the pronged end portion 32 to force food off of the fork.

FIG. 7 illustrates a still further embodiment, namely that of a spoon, which has a body generally referred to by the numeral 39. The body is formed with a handle 44 and a dished receptacle end portion 46 for holding food. A scraper 48, which comprises a dish-shaped member, is formed at the curved outer part of the arm, generally referred to by the numeral 52. The arm 52 has a straight section 54 that joins with the handle 44 of the body 39 at 42. The resiliently deformable arm 52 has an upwardly bowed portion that extends most of the length of the arm 52. In operation, as the bowed scraper arm 52 is manually pressed towards the handle 44, the dish-shaped scraper 48 on the free end of the scrapper arm 52 moves outwardly to slide the scraper 48 along the concaved surface of the dished receptacle end portion 46 to clear any food or the like off of the spoon.

FIG. 8 is a fourth preferred embodiment of the dispensing utensil of the present invention and a further embodiment of a spoon. In FIG. 8, there is a bowed scraper arm 60 with a scraper edge 62 at the free end thereof for slideable engagement with the dished receptacle portion 64 of the handle 66. Again, the operation of this embodiment is similar to the operation of the embodiment shown in FIGS. 1 to 5. As the bowed handle 60 is flexed to carry it toward the handle 66, the scraper edge 62 is pushed outwardly along the dished receptacle portion 64 to scoop food off of the spoon.

FIG. 9 is a fifth preferred embodiment of the dispensing utensil 500 of the present invention, and is similar to FIG. 8, except that it is a "spork", which is a combination of a spoon and a fork.

A sixth preferred embodiment of the dispensing utensil 600 of the present invention is shown in FIGS. 10 and 11. The substance holding portion 602 is more of a slightly curved blade, essentially of a cross between a spoon and a knife, and the scraper 604 is small in height and has a concave front surface 606.

The seventh preferred embodiment of the dispensing utensil 700 is shown in FIGS. 12 through 14, and has an extended handle 702 and an arm 703 having an inverted "v-shaped" upwardly bowed portion 704. The rear portion 706 of the inverted "v-shaped" upwardly bowed portion 704 presents a rear-facing thumb-engaging portion 706 that is widened to accommodate receiving a person's thumb. When the upwardly bowed portion 704 is pushed forwardly at the rear-facing thumb-engaging portion 706, the substance pushing member 708 is moved along the substance-holding end portion 710 from its rest position to its flexed dispensing position. The arm 703 further comprises a low profile portion 712 disposed rearwardly of the upwardly bowed portion 704 and disposed in close relation to the handle 702, with perhaps about one-quarter inch between the low profile portion 712 and the handle 702. The bowed profile portion 712 and the handle 702 together form a readily graspable portion, which permits ready engagement of the rear-facing thumb-engaging portion 706 by a user's thumb.

An eighth embodiment of the dispensing utensil 800 is shown in FIG. 15, which is similar to FIG. 6, except that the dispensing utensil 800 is made from two pieces of material, a first piece of material 802 and a second piece of material 804, each being either plastic or metal, secured together by a fastener 806, such as a rivet or machine screw.

A ninth preferred embodiment of the dispensing utensil 900 of the present invention is shown in FIGS. 16 through 19. The dispensing utensil 900 has a scraper blade 902 that is oriented substantially perpendicularly to the substance-holding end portion 904, and moves laterally across the substance holding portion 904 as indicated by arrow 18*a* in FIG. 18 so as to be movable across the width of the substance-holding end portion 904. By "moves laterally", it is meant that the scraper blade 902, which is an example of a food removal member of the dispensing utensil 900, moves in a direction that is at least partly normal to a plane that is defined by the longitudinal axes of the handle and the substance-holding end portion 904. There is also an enlarged thumb-engaging portion 906.

A tenth preferred embodiment of the dispensing utensil 1000 of the present invention is shown in FIGS. 20 through 23. The dispensing utensil 1000 has a substance holding portion in the form of a gathering blade 1002, essentially a knife, and a scraper blade 1004 that is moved downwardly so as to scrape laterally across the gathering blade, as indicated by arrows 21*a* in FIGS. 21 and 23*a* in FIG. 23. The bottom edge 1006 of the scraper blade 1004 may be slightly concaved and form a sharp inner edge 1008 that scrapes against the gathering blade 1002, as can be best seen in FIG. 23.

Reference will now be made to FIG. 24, which shows an eleventh preferred embodiment of the dispensing utensil 1100 of the present invention. The dispensing utensil 1100 has a single fork tine 1102 that is used to impale objects, such as pickles. The pusher blade 1104 moves along the single tine 1102 to push the pickle off the tine, in a manner similar to that illustrated for removing food as shown in FIGS. 2 through 5 of the first preferred embodiment of the dispensing utensil of the present invention.

A twelfth preferred embodiment of the dispensing utensil 1200 of the present invention, as shown in FIG. 25, is similar to that shown in FIG. 24, except that it has a plurality of tines 1202 and the pusher blade 1204 is correspondingly wide so as to extend across the plurality of tines 1202.

A thirteenth preferred embodiment of the dispensing utensil 1300 of the present invention is shown in FIG. 26, which dispensing utensil is similar to that shown in FIGS. 20 through 23, except that the gathering blade 1302 (substance holding end portion) is rounded and serrated.

A fourteenth preferred embodiment of the dispensing utensil 1400 of the present invention is shown in FIGS. 27 through 29. The scraper blade 1402 is connected to the body portion 1404 of the handle 1406 by an upwardly bowed portion 1408. Further, the scraper blade 1402 has an inverted "L-shaped" cross-section to help scrape substances off the scraper blade 1402 (the substance holding end portion) of the dispensing utensil 1400.

A fifteenth preferred embodiment of the dispensing utensil 1500 of the present invention is shown in FIG. 30. The substance holding end portion 1502 has concave from front to back, but is shaped straight laterally to permit ready scraping by the scraper blade 1504 that is curved to match the concave shape of the substance holding end portion 1502. The scraper blade 1504 is removably connected to the body portion 1506 of the dispensing utensil 1500 by a laterally bowed portion 1508 that terminates in an end loop 1510, with the aperture 1512 of the loop 1510 receiving the handle 1514 of the dispensing utensil 1500.

A sixteenth preferred embodiment of the dispensing utensil 1600 of the present invention is shown in FIG. 31, and is similar to the fifteenth preferred embodiment of the dispensing utensil of the present invention is shown in FIG. 30, except that the scraper blade 1602 is integrally connected to the body portion 1604 of the dispensing utensil 1600 by a laterally bowed portion 1606.

A seventeenth preferred embodiment of the dispensing utensil 1700 of the present invention is shown in FIGS. 32 and 33, and is similar to the seventh preferred embodiment is shown in FIGS. 12 through 14, except that the inverted "v-shaped" portion 1702 terminates near the forward portion 1704 of the handle 1706, and the substance scraping portion 1708 is wide so as to cover most of the width of the "spork". The rear portion 1710 of the inverted "v-shaped" portion 1702 is widened to accommodate receiving a person's thumb.

An eighteenth preferred embodiment of the dispensing utensil 1800 of the present invention is shown in FIG. 34, and is similar to the seventeenth preferred embodiment is shown in FIGS. 32 and 33, except that the forward portion 1802 of the handle portion 1804 is more gently curved.

A nineteenth preferred embodiment of the dispensing utensil 1900 of the present invention is shown in FIG. 35, and is similar to the eighteenth preferred embodiment is shown in FIG. 34, except that the inverted "v-shaped" portion 1902 is actually a curved shape and does not have a widened portion.

A twentieth preferred embodiment of the dispensing utensil 2000 of the present invention is shown in FIG. 36, and is similar to the sixth preferred embodiment is shown in FIGS. 10 and 11, except that the dispensing utensil 2000 is a fork.

A twenty-first preferred embodiment of the dispensing utensil 2100 of the present invention is shown in FIG. 37, and is similar to the twentieth preferred embodiment of the dispensing utensil of the present invention is shown in FIG. 36, except that the dispensing utensil 2100 is a "spork", and the downwardly turned end portion 2102 of the scraper 2104 is smaller.

A twenty-second preferred embodiment of the dispensing utensil 2200 of the present invention is shown in FIG. 38, and is similar to the twenty-first preferred embodiment of the dispensing utensil of the present invention is shown in FIG. 37, except that the end portion 2202 of the scraper 2204 is upwardly turned and larger.

A twenty-third preferred embodiment of the dispensing utensil 2300 of the present invention is shown in FIGS. 39 through 41, and comprises a first portion 2301 (shown separately in FIG. 40) and a second portion 2302 (shown separately in FIG. 41). The first portion 2301 is in the form of a spoon (although other forms such as a fork, "spork", or the like would also work) and includes a handle portion 2304 attached to a substance-holding end portion 2306. The second portion 2302 includes a scraper arm 2308, with one end of the scraper arm 2308 connecting with a scraper 2310 and the other end of the scraper arm 2308 having a "C"-shaped mounting portion 2312 that permits the second portion 2302 to be removably connected to the handle portion 2304 at a co-operating reduced portion 2314. It is also contemplated that the second portion 2302, or an element similar to it, could be mounted onto a conventional spoon, fork, "spork", or the like, and be used in an analogous manner as described herein.

A twenty-fourth preferred embodiment of the dispensing utensil 2400 of the present invention is shown in FIGS. 42 through 45. The dispensing utensil 2400 comprises a body 2402 extending between a front end 2402f and a back end 2402b. The body 2402 has a handle 2404 and a substance-holding end portion 2406 having a width "W" and a length "L". A substance pushing member 2408 in the form of a scraper is used for removing substance from the substance-holding end portion 2406 of the body 2402.

An arm 2410 has a front end 2410f and a back end 2410b. The arm 2410 is connected adjacent the front end 2410f to the substance pushing member 2408 and is pivotally connected adjacent the back end 2410b to the handle 2404 by means of co-axial pins 2412 pivotally disposed in co-operating orifices 2414 in the handle 2404.

The substance pushing member 2408 is movable along the substance-holding end portion 2406 between a rest position, as shown in FIG. 46, and a dispensing position, as shown in FIG. 47. The distance between the rest position and the dispensing position comprises a substantial portion of the substance-holding end portion 2406.

The resiliently deformable arm has an upwardly bowed portion 2416 that presents a rear-facing thumb-engaging portion 2418. When the upwardly bowed portion 2416 is pushed forwardly at the rear-facing thumb-engaging portion 2418, the substance pushing member 2408 is moved along the substance-holding end portion 2406 from the rest position to the flexed dispensing position.

A twenty-fifth preferred embodiment of the dispensing utensil 2500 of the present invention is shown in FIGS. 46 and 47. The dispensing utensil 2500 is similar to first preferred embodiment dispensing utensil 8, for instance, except that the resiliently deformable arm 2502 is bowed downwardly under the handle 2504 and extends upwardly around the substance holding end portion 2506, to terminate in a substance pushing member 2508 above the substance holding end portion 2506. Alternatively, the arm 2502 could pass through a slot (not shown) in the substance holding end portion 2506. In use, squeezing together the resiliently deformable arm 2502 and the handle 2504, as indicated by arrow "G", causes the substance pushing member 2508 to move along the upwardly slanted substance holding end portion 2506 thereby dispensing substance therefrom.

From the foregoing it will be apparent that the invention achieves its objective of providing a simple efficient rugged and inexpensive dispensing utensil that permits ready dispensing of substances, such as food, carried thereon, with an easy operation of the hand in a sanitary manner. It fulfils a longstanding want for such a device, especially in the serving of buffet style meals, bulk food dispensing situations and barbeque condiment settings. As can be understood from the above description and from the accompanying drawings, the present invention provides a dispensing utensil which is not found in the prior art.

Other variations of the above principles will be apparent to those who are knowledgeable in the field of the invention, and such variations are considered to be within the scope of the present invention. Further, other modifications and alterations may be used in the design and manufacture of the dispensing of the present invention without departing from the spirit and scope of the accompanying claims.

I claim:

1. A food dispensing utensil comprising:
   a handle having an end;
   a food engaging feature connected to the end of the handle;
   a food removal member associated with the food engaging feature for removing food from the food engaging feature, the food removal member having an interface for engaging the food, the food removal member being separable from the food engaging feature and movable relative to the food engaging feature; and
   a resiliently deformable connector for bridging said food removal member and said handle;
   wherein the connector is deformable towards the handle to cause said food removal member to slidably move relative to said food engaging feature and in contact with the food engaging feature between a rest position and a flexed dispensing position;
   wherein the sliding movement of the food removal member between said rest position and said flexed dispensing position, and along a substantial portion of a length of the food engaging feature, permits the interface of the food removal member to contact food to encourage removal of at least some of any food engaged with the food engaging feature; and
   wherein said handle, said food engaging feature, said food removal member and said connector are formed from a single unitary piece of material.

2. The food dispensing utensil of claim 1, wherein said food removal member is movable in a direction substantially within a plane defined by a longitudinal axis of the handle and a longitudinal axis of the food engaging feature.

3. The food dispensing utensil of claim 1, wherein said connector comprises a concave portion that is curved away from the handle.

4. The food dispensing utensil of claim 1, wherein said handle is substantially rigid.

5. The food dispensing utensil of claim 1, wherein the handle is connected to the food engaging feature via a body member.

6. The food dispensing utensil of claim 1, wherein the single unitary piece of material is a plastic material.

7. The food dispensing utensil of claim 1, wherein the single unitary piece of material is a metal material.

8. The food dispensing utensil of claim 1, wherein the interface of the food removal member comprises pushing surface for engaging the food, the pushing surface having a non-zero angle relative to a major portion of the food removal member and angled away from the food engaging feature.

9. A food dispensing utensil comprising:
a handle having an end;
a food engaging feature connected to the end of the handle;
a food removal member associated with the food engaging feature for removing food from the food engaging feature, the food removal member having an interface for engaging the food, the food removal member being separable from the food engaging feature and movable relative to the food engaging feature; and
a resiliently deformable connector for bridging said food removal member and said handle;
wherein said food engaging feature is angled away along an entire length of the food engaging member from a longitudinal axis of the handle;
wherein the connector is deformable towards the handle to cause said food removal member to slidably move relative to said food engaging feature and in contact with the food engaging feature between a rest position and a flexed dispensing position;
wherein the sliding movement of the food removal member between said rest position and said flexed dispensing position, and along a substantial portion of a length of the food engaging feature, permits the interface of the food removal member to contact food to encourage removal of at least some of any food engaged with the food engaging feature; and
wherein said handle, said food engaging feature, said food removal member and said connector are formed from a single unitary piece of material.

10. The food dispensing utensil of claim 9, wherein the single unitary piece of material is a plastic material.

11. The food dispensing utensil of claim 9, wherein the single unitary piece of material is a metal material.

12. The food dispensing utensil of claim 9, wherein said food removal member is movable in a direction substantially within a plane defined by the longitudinal axis of the handle and the longitudinal axis of the food engaging feature.

13. The food dispensing utensil of claim 9, wherein said connector comprises a concave portion that is curved away from the handle.

14. The food dispensing utensil of claim 9, wherein said handle is substantially rigid.

15. The food dispensing utensil of claim 9, wherein the handle is connected to the food engaging feature via a body member.

16. The food dispensing utensil of claim 9, wherein the interface of the food removal member comprises pushing surface for engaging the food, the pushing surface having a non-zero angle relative to a major portion of the food removal member and angled away from the food engaging feature.

* * * * *